March 2, 1937.  B. H. BEDFORD  2,072,663
BREAD BUTTERER
Filed Jan. 11, 1935  2 Sheets-Sheet 1

INVENTOR
Ben H. Bedford
BY
ATTORNEY

March 2, 1937.  B. H. BEDFORD  2,072,663
BREAD BUTTERER
Filed Jan. 11, 1935  2 Sheets-Sheet 2
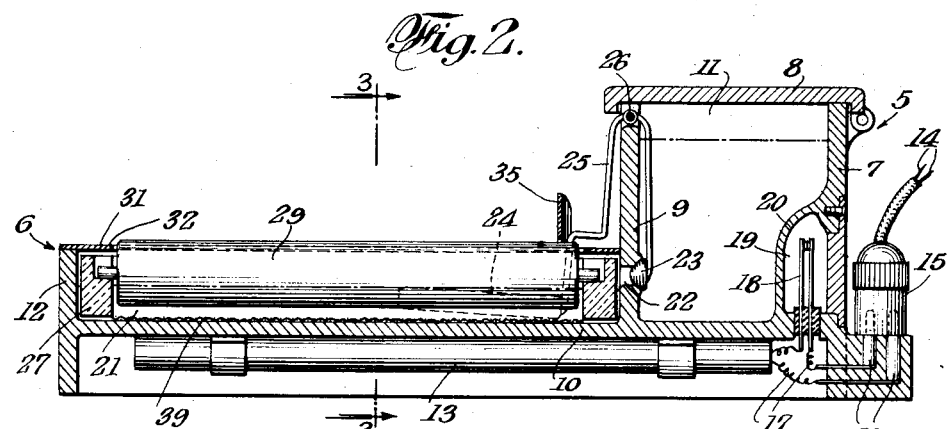
INVENTOR
Ben H. Bedford
BY
ATTORNEY Patented Mar. 2, 1937

2,072,663

UNITED STATES PATENT OFFICE 2,072,663

BREAD BUTTERER

Ben H. Bedford, Fayetteville, N. Y.

Application January 11, 1935, Serial No. 1,310

1 Claim. (Cl. 91—51)

This invention relates to devices for buttering bread, toast, etc., and relates particularly to devices of the general type exemplified in my Patent No. 1,979,436.

Broadly, the invention has for its primary objects, the provision of a novel device of the character hereinafter set forth in which butter is melted in a melting box or the like, and then valved automatically into a flat applicator reservoir which is provided with applicator means so that slices of bread or the like may be expeditiously buttered by merely passing them over the applicator.

Other novel features of the invention reside in the provision of float means to maintain at a constant level the butter in the reservoir; to regulate automatically the butter heating means; to adjust the amount of butter applied to a slice of bread; etc.

These and other numerous objects and features of the invention and the means for their attainment are more fully set forth in the following detailed specification, which is based on the accompanying drawings, in which preferred forms of the invention are illustrated, and in which:

Fig. 2 is a cross-sectional view as taken through the device on line 2—2 of Figure 1.

Fig. 3 is a longitudinal sectional view as taken along the line 3—3 of Figure 2.

Fig. 4 is a broken longitudinal sectional view through an alternate form of device.

Figure 1:
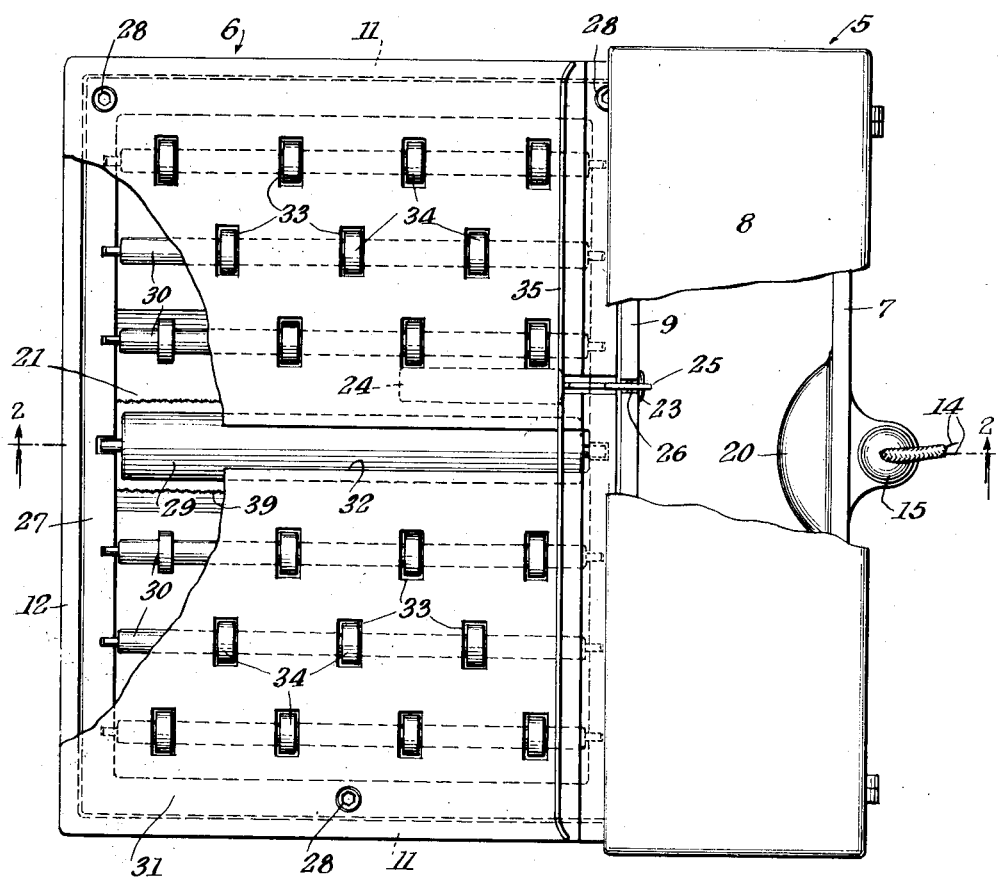
Fig. 1 is a top plan view of a preferred device as contemplated in the present invention, portions being broken away for clearer illustration.

Describing the invention in greater detail, there is shown in Figures 1, 2, and 3, a preferred form of the invention in which the device comprises, generally, a melting box 5 and a butterer 6. These two major portions of the device are preferably arranged as shown so as to afford a clear path for a slice of bread as it is passed across the butterer. While here shown as integrally formed, these two units may be separately fabricated and then assembled in any convenient manner.

The melting box 5 comprises a rear wall 7 carrying a hinged cover 8 for the box, a front wall 9, the lower portion of which is common to the melting box and the butterer, and a bottom wall 10 which extends completely under both the melting box and the butterer; and in a similar manner the end walls 11 of the butterer extend to provide end closures for the melting box. To enclose the front of the butterer, there is provided the wall 12.

As can be seen from the drawings the melting box provides a container capable of receiving a substantially solid piece of butter through its top opening which may be melted by means of the electrical heating unit 13 carried beneath the bottom wall 10. While other forms of heating may be employed, the form shown is preferred. Electric current is supplied to the heater from a convenient source through the conductors 14, the plug connector 15, the terminals 16, and wires 17.

In the present disclosure, it is desired to control the heat generated in the heating unit and for this purpose there is provided a switch in the form of a thermostatic control 18 placed in series with the heater. This control is conveniently placed as in a chamber 19 having a wall 20 common to both the chamber and the melting box. In this manner, excessive heat in the melting box will be transmitted through the wall 20 to the thermostatic control which will open the electric circuit to the heater. Of course, when the temperature in the melting box is lowered to a determined point, the thermostatic control will then close the circuit to the heater, and so a positive and automatic heat control is provided.

The butterer 6 is provided with a melted butter well 21 formed in its bottom and the wall 9 is provided with a port 22 valved as at 23. Melted butter is passed from the box 5 to the butterer 6 through the port 22 when the valve 23 is open. This is automatically accomplished by the provision of a float 24, positioned in the well and connected by means such as the wire 25 pivoted at 26.

As can be seen when the level of butter in the well is sufficiently high to raise the float, the valve 23 will close the port 22 to prevent ingress of butter from the melting box to the butterer, but when the level in the well is reduced somewhat, the float will drop and thus open the port 22 to permit passage of butter into the butterer. In this simple manner the level of butter in the well is kept well nigh constant.

Since the heater is positioned so as to also provide heat to the butter, the butter in both the melting box and the butterer will be of the same consistency.

In the form of the invention now being described, the butterer is provided with a glass or porcelain frame or rack 27 adjustably supported in the butterer by means such as the screws 28. The frame supports for free rotation, a roller 29 of the same or similar material as the rack. This roller is partially immersed in the butter in the well 21 and functions as an applicator roll. Flanking the roller 29 there is provided a plurality of conveyor rolls 30, also rotatably carried by the frame 27. These rolls are not immersed in the butter but merely serve to function as conveyors for a slice of bread passed across the butterer.

The butterer is preferably provided with a covering such as the sheet 31 which is slotted at 32 so the roller 29 may protrude above the top surface thereof, and slotted at 33 so the enlargements 34 of the rolls 30 may similarly protrude.

It will be noted that the sheet 31 is carried by the walls 11 and the wall 12 of the butterer and is therefor fixed, though removable; and that the applicator roller 29 and the conveyor rolls 30 are carried by the frame 27 which, by means of the screws 28, is adjustable up and down. In this simple manner the degree of protrusion of the rollers may be determined to an exact nicety and thus careful control of the thickness of butter film presented to a slice of bread is accomplished, the thickness of this film being determined by the spaces between the applicator roller and the edges of the slot 32.

In order to more surely guide a bread slice across the top of the butterer, a back guide 35 is preferably provided as shown.

It will be noted that the port 22 is positioned somewhat above the top of the bottom wall 10 so that sediment in the melting box is not conveyed into the butterer.

The roller 29 is preferably provided with an encompassing screen such as shown at 39 to prevent crumbs from a bread slice, which may fall through the slots 33, from contacting the surface of the roller.

Since it is essential that devices of this type be kept clean and free from rancid odors, the construction is preferably such as to lend itself to be completely disassembled for thorough cleansing.

In the form of the invention shown in Figure 4, the frame 27 is omitted and the rolls 30 are carried directly by the butterer. The applicator roller, however, is mounted in a yoke 36, pivoted at 37, and adjustable up and down in relation to the sheet 31 by means such as the screw 38.

While the many features and advantages of the invention as here disclosed have been based on the forms of the invention illustrated, it should be understood that changes in constructional details, proportions and arrangement of the parts may be resorted to without departing from the scope and spirit of the invention as claimed.

Having thus described my invention, what I claim as new and desire to secure by Letters Patent, is:

In a buttering device, a butter reservoir, a supporting frame in the reservoir, an applicator roller rotatably mounted in said frame and having its bottom portion in the butter in the reservoir, bread slice conveyor rolls rotatably mounted in said frame above the level of the butter in the reservoir, a slotted cover plate for said reservoir through which the upper portions of the applicator roller and conveyor rolls protrude, and means to elevate and lower the supporting frame to vary the degree of protrusion of said roller and rolls.

BEN H. BEDFORD.